United States Patent
Ke

(10) Patent No.: US 9,860,481 B2
(45) Date of Patent: Jan. 2, 2018

(54) INFORMATION PROCESSING METHOD AND ELECTRONIC DEVICE

(71) Applicants: Beijing Lenovo Software LTD., Beijing (CN); Lenovo (Beijing) Limited, Beijing (CN)

(72) Inventor: Yan Ke, Beijing (CN)

(73) Assignees: BEIJING LENOVO SOFTWARE LTD., Beijing (CN); LENOVO (BEIJING) LIMITED, Beijing (CN)

( * ) Notice: Subject to any disclaimer, the term of this patent is extended or adjusted under 35 U.S.C. 154(b) by 141 days.

(21) Appl. No.: 14/211,070

(22) Filed: Mar. 14, 2014

(65) Prior Publication Data

US 2014/0294367 A1    Oct. 2, 2014

(30) Foreign Application Priority Data

Mar. 26, 2013   (CN) .......................... 2013 1 0100348

(51) Int. Cl.
*H04N 5/76* (2006.01)
*H04N 5/765* (2006.01)
(Continued)

(52) U.S. Cl.
CPC .......... *H04N 5/765* (2013.01); *H04N 21/236* (2013.01); *H04N 9/8205* (2013.01)

(58) Field of Classification Search
CPC ..... H04N 5/765; H04N 21/236; H04N 9/8205
(Continued)

(56) References Cited

U.S. PATENT DOCUMENTS

| 5,909,238 A * | 6/1999 | Nagashima | ........ H04N 7/17309 |
| | | | 348/E7.07 |
| 2003/0184826 A1* | 10/2003 | Takemoto | ............ H04N 1/6086 |
| | | | 358/518 |

(Continued)

FOREIGN PATENT DOCUMENTS

| CN | 101808219 A | 8/2010 |
| CN | 101931779 A | 12/2010 |

OTHER PUBLICATIONS

First Office Action for Chinese Patent Application No. 201310100348.3, dated Nov. 18, 2016, 4 pages.

*Primary Examiner* — William Tran
(74) *Attorney, Agent, or Firm* — Westman, Champlin & Koehler, P.A.

(57) ABSTRACT

The present invention provides an information processing method and an electronic device. The method is applied in a first electronic device and comprises: obtaining a first data; obtaining P frame images based on the first data, where P is an integer larger than or equal to 1; obtaining a second data based on a data channel with a second electronic device; obtaining Q frame images based on the second data, where Q is an integer larger than or equal to 1; generating a video stream of M frame images based on the P frame images and the Q frame images, where M<P+Q. With the present invention, based on the video data of both communication parties, the video or voice data can be clipped based on a processing rule to generate a video stream, such that the resulting video stream can be more compact and continuous and have a better viewing effect. The generated video stream can be used as a communication record for the communication parties which is convenient for the user to view or play as desired.

14 Claims, 3 Drawing Sheets

(51) Int. Cl.
*H04N 21/236* (2011.01)
*H04N 9/82* (2006.01)

(58) Field of Classification Search
USPC .......................................... 386/341
See application file for complete search history.

(56) References Cited

U.S. PATENT DOCUMENTS

| | | | |
|---|---|---|---|
| 2008/0043290 A1* | 2/2008 | Imamura | G06F 17/214 |
| | | | 358/403 |
| 2010/0008639 A1* | 1/2010 | Greenberg | G06Q 10/06 |
| | | | 386/248 |
| 2010/0149308 A1* | 6/2010 | Mihara | H04N 7/152 |
| | | | 348/14.09 |
| 2011/0217021 A1* | 9/2011 | Dubin | H04N 7/15 |
| | | | 386/278 |
| 2011/0246172 A1* | 10/2011 | Liberman | G06F 17/289 |
| | | | 704/2 |
| 2012/0016892 A1* | 1/2012 | Wang | G06F 17/30247 |
| | | | 707/752 |
| 2014/0267560 A1* | 9/2014 | Bright-Thomas | H04N 7/152 |
| | | | 348/14.08 |

\* cited by examiner

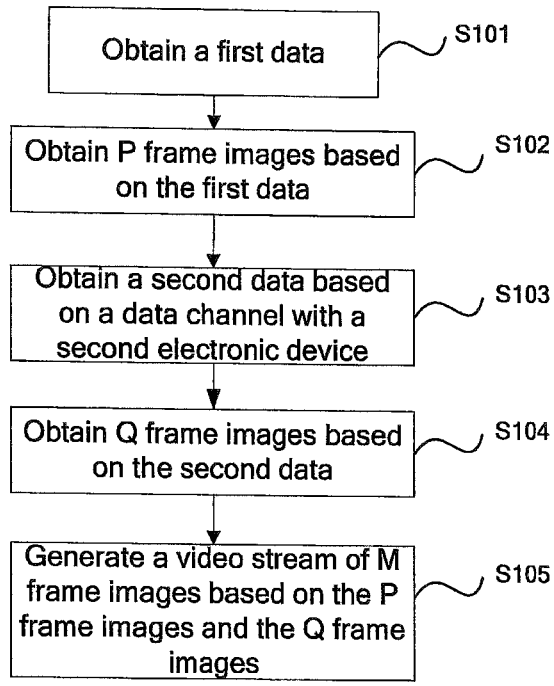
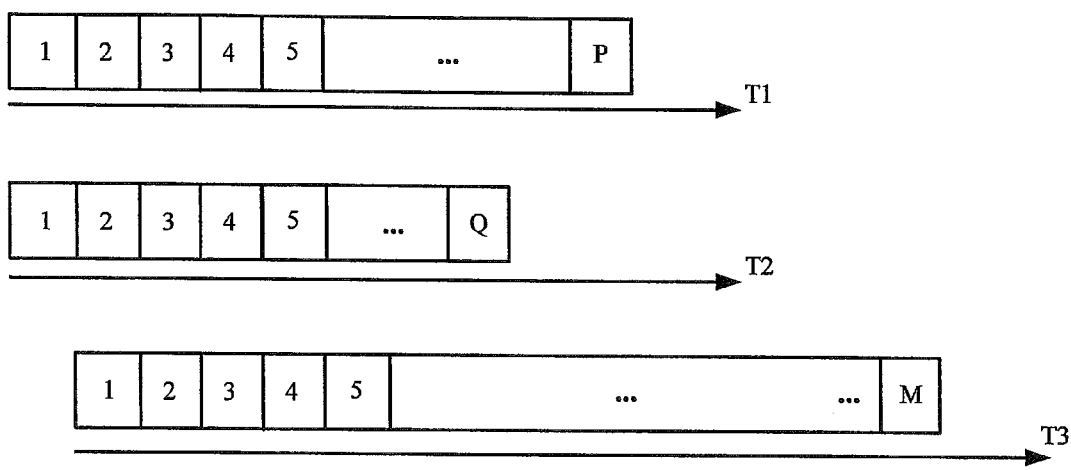

INFORMATION PROCESSING METHOD AND ELECTRONIC DEVICE

CROSS-REFERENCE TO RELATED APPLICATION

This Application claims the benefit and priority of a foreign application filed in China as Application No. 201310100348.3 on Mar. 26, 2013, all of which is incorporated herein by reference.

TECHNICAL FIELD

The present invention relates to communication technology, and more particularly, to an information processing method and an electronic device.

BACKGROUND

With the rapid development of the communication technology and the Internet technology, instant network communication systems, such as SKYPE, MSN and QQ, that are completely different from traditional communication systems including mail, telephone and telegram, have arisen. With the instant communication system, even people remote from each other can have a real-time, face-to-face conversation. While the traditional mail and telegram are text-based and the telephone is voice-based, in the current instant communication service, users can not only exchange text information with each other, but also perform various operations such as voice and/or video interaction, file transfer and the like.

During the implementation of the present invention, the inventors found at least the following defects in the prior art.

1) When a user uses an instant communication tool for video communication with his/her friend or contact, typically he/she cannot efficiently save the video data of both communication parties. Unlike text data, the video data cannot be saved as a communication log or record so as to be viewed or played later conveniently as desired.

2) When a user is having a data communication with another user, if one of the communication parties uses a video or voice tool while the other can only have a text-based communication (due to his/her inconvenience in using any video or voice tool), the communication between the communication parties is very inconvenient. Also, it is inconvenient to save and view their communication record.

3) The current instant communication clients cannot provide functions for processing and storing the video data of both communication parties, particularly when they have different formats of communication data. It is not possible to process or store the communication data according to the respective categories of data of the communication parties.

Of course, it can be appreciated by those skilled in the art that it is not necessary for every one of the embodiments of the present application to have all the above features.

The other features and advantages of the present invention will be explained in the following description. They can be partly apparent from the description, or can be understood by implementing the present invention. The object and other advantages of the present invention can be achieved and obtained from the structure specified in the description, claims and figures.

SUMMARY

It is an object of the present invention to solve the problem in the prior art that a user using an instant communication system for video, voice or text communication cannot conveniently save an associated video stream.

According to an embodiment of the present invention, an information processing method applied in a first electronic device is provided. The method comprises: obtaining a first data; obtaining P frame images based on the first data, where P is an integer larger than or equal to 1; obtaining a second data based on a data channel with a second electronic device; obtaining Q frame images based on the second data, where Q is an integer larger than or equal to 1; generating a video stream of M frame images based on the P frame images and the Q frame images, where $M<P+Q$.

According to another embodiment of the present invention, an electronic device is provided. The electronic device comprises: a communication unit configured to establish a data channel with a second device; a data collection unit configured to obtain a first data and obtain a second data based on a data channel with the second electronic device; and a data processing unit configured to: obtain P frame images based on the first data, where P is an integer larger than or equal to 1; obtain Q frame images based on the second data, where Q is an integer larger than or equal to 1; and generate a video stream of M frame images based on the P frame images and the Q frame images, where $M<P+Q$.

When compared with the prior art, the above solutions have the following advantageous effects:

1) In one of the above solutions, a video stream can be generated based on the video data of both communication parties in accordance with a particular processing rule. The generated video stream can be used as a communication record for the communication parties which is convenient for the user to view or play as desired.

2) In one of the above solutions, when it is inconvenient for one of the communication parties to have a video or voice communication while the other can have a video or voice communication, frame images can be generated based on characters corresponding to the input text in the text data. The generated frame images and the frame images obtained based on the video data can be used as frame images of a video stream. The video stream can then be stored as a communication record for the communication parties.

3) In one of the above solutions, the video or voice data can be clipped and concatenated, such that the resulting video stream can be more compact and continuous and have a better viewing effect.

4) In one of the above solutions, the electronic device can provide the functions for processing and storing the video data of the communication parties. Further, when the communication parties have different data formats of communication data, the communication data can be processed and stored according to the respective categories of data of the communication parties.

Of course, it can be appreciated by those skilled in the art that it is not necessary for every one of the embodiments of the present application to have all the above features.

The other features and advantages of the present invention will be explained in the following description. They can be partly apparent from the description, or can be understood by implementing the present invention. The object and other advantages of the present invention can be achieved and obtained from the structure specified in the description, claims and figures.

BRIEF DESCRIPTION OF THE DRAWINGS

In order to allow a better understanding of the solutions of the present invention, the following figures are provided.

The figures constitute a part of the description and are used for illustrating the solutions of the present invention along with the embodiments of the present application, rather than limiting the scope of the present invention.

FIG. 1 is a flowchart illustrating the information processing method according to an embodiment of the present invention;

FIG. 2 is a schematic diagram of frame images in a video stream according to an embodiment of the present invention;

DETAILED DESCRIPTION OF THE EMBODIMENTS

Figure 3:
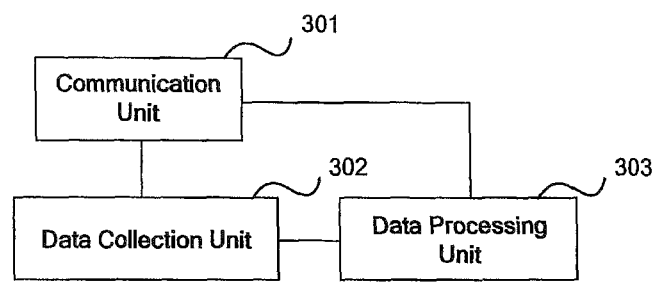
FIG. 3 is a schematic diagram showing the components of the electronic device according to an embodiment of the present invention.

In the following, the embodiments of the present invention will be described in detail with reference to the figures, such that the objects, solutions and advantages of the present invention will become more apparent. It is to be noted that the embodiments of the present invention and their specific features can be combined with each other, provided that they do not conflict.

In the following embodiments of the present invention, the first electronic device and the second electronic device can include, but not limited to, personal computers, smart mobile terminals and tablet computers using traditional networks or smart mobile terminals, portable computers and video phones using mobile internets.

The information processing method according to an embodiment of the present invention will be described below with reference to FIG. 1. The information processing method of this embodiment can be applied in a first electronic device which establishes a data channel with a second electronic device for data communication. As shown in FIG. 1, the information processing method of this embodiment includes the following steps.

At step S101, the first electronic device obtains a first data.

For example, the first electronic device can collect the first data corresponding to a first user that uses the first electronic device by using a local video/voice collection module or text collection module. Here the first data may include various categories of data such as video data, voice data or text data.

At step S102, the first electronic device obtains P frame images based on the first data, where P is an integer larger than or equal to 1.

For example, when the first data is a video data, the step of obtaining the P frame images based on the first data may include extracting all the frame images (P frame images in total) from the video data.

When the first data is a text data, the step of obtaining the P frame images based on the first data may include: each time a valid text input (i.e., a successfully transmitted text represented by e.g., a special character such as a carriage return) is collected, generating a frame image corresponding to the valid text input. For example, characters corresponding to each valid text input can be inserted into a blank frame or a preset background frame, resulting in a corresponding frame image. Meanwhile, a timestamp corresponding to the valid text input is also recorded. For example, the time at which the special character is collected can be recorded as the timestamp of the valid text input and used as a timestamp of the resulting frame image. If there are P valid text inputs in the first data, P frame images will be generated in total.

When the first data is a voice data, the step of obtaining the P frame images based on the first data may include converting a voice input into a text input by means of voice recognition and obtaining the P frame images according to the process for valid text input as described above. Alternatively, it may include using a blank frame or one or more preset frame images as the frame image(s) corresponding to the voice data.

At step S103, the first electronic device obtains a second data based on a data channel with the second electronic device.

The first electronic device can collect the second data corresponding to a second user that uses the second electronic device by using a local data collection unit. Here the second data may include various categories of data such as video data, voice data or text data.

For example, when the second data is a video data or a video data, the first electronic device can obtain the video data or voice data of the second user that uses the second electronic device based on the data channel with the second electronic device and store it locally.

When the second data is a text data, the first electronic device can obtain text information input by the second user based on the data channel with the second electronic device and display it on a display unit of the first electronic device.

At step S104, the first electronic device obtains Q frame images based on the second data, where Q is an integer larger than or equal to 1.

The step S104 is similar to the above step S102. The details of the step S104 can be known by referring to the description of the above step S102 and thus will be omitted here.

At step S105, the first electronic device generates a video stream of M frame images based on the P frame images and the Q frame images, where M<P+Q.

In an embodiment of the present invention, at the step S105, the first electronic device recognizes whether each of the first data and the second data contains any voice or valid text input based on the respective categories of the first data and the second data. If each of the first data and the second data contains a voice or valid text input, each frame image containing a voice or valid text input will be used as a frame image in the video stream, thereby generating the video stream of M frame images.

In the following, the process for generating the video stream of M frame images will be described in detail with reference to FIG. 2.

As shown in FIG. 2, in an embodiment of the present invention, P frame images are obtained from the first data based on a first time axis T1; and Q frame images are obtained from the second data based on a second time axis T2. Typically the first time axis T1 is consistent with the second time axis T2. For example, both communication parties begin collecting the video data once a data channel is established between them. Thus, the first data and the second data are typically based on the same time axis.

In a typical data communication process, when one of the communication parties is sending data, the other is receiving the data, i.e., it is seldom that both communication parties send data at the same time. Thus, the P frame images and the Q frame images each will contain one or more frame images that contain no voice input. Whether a frame image contains a voice input may depend on whether a user is talking or not.

Referring to FIG. 2, in an embodiment of the present invention, the video stream of M frame images is generated based on the P frame images and the Q frame images by: recognizing, from the P frame images, K frame images in the first data each containing an object having a voice input, where K is a positive integer smaller than P; recognizing, from the Q frame images, J frame images in the second data each containing an object having a voice input, where J is a positive integer smaller than Q; and combining the K frame images and the J frame images in chronological order of their respective timestamps to generate the video stream of M frame images.

Since the first time axis T1 is consistent with the second time axis T2, in order to generate the video stream of M frame images based on a third time axis T3, the K frame images and the J frame images can be combined in chronological order of their respective timestamps on the time axis, resulting in the video stream of M frame images. Here, the third time axis T3 starts from the timestamps of the K frame images or the timestamps of the J frame images, whichever are earlier.

Further, when the first time axis T1 is inconsistent with the second time axis T2, the first data based on the first time axis T1 and the second data based on the second time axis T2 can be temporally synchronized before being subjected to the above processing. The present invention is not limited to any specific temporal synchronization process.

Further, when the first data is a video data and the second data is a video data, there is a special case where each of the first data and the second data contains an object having a voice input. In this case, the processing rule includes: when each of the first data and the second data contains an object having a voice input, concatenating two corresponding frame images into one frame image as a frame image in the video stream.

Here, the first electronic device can determine whether the video data contains an object (e.g., the first user using the first electronic device or the second user using the second electronic device) having a voice input (i.e., whether there is someone talking) by recognizing an action of the user's mouth using an image recognition technique or recognizing whether the video data contains any voice data.

In an embodiment of the present invention, when the first data is a text data based on the first time axis and the second data is a video data based on the second time axis, the video stream of M frame images is generated based on the P frame images and the Q frame images by: obtaining characters and timestamps corresponding to a valid text input as identified by a special character and obtaining P frame images based on the characters corresponding to the valid text input, where P is an integer larger than or equal to 1; recognizing whether the video data contains an object having a voice input and recognizing, from the Q frame images, J frame images in the second data each containing an object having a voice input, where J is a positive integer smaller than Q; and combining the P frame images and the J frame images in chronological order of their respective timestamps to generate the video stream of M frame images.

Further, when the first data is a voice data and the second data is a video data, the processing rule may include converting a voice input into a text input by means of voice recognition and performing the process for valid text input as described above. Alternatively, it may include using a blank frame or one or more preset frame images as the frame image(s) corresponding to the voice data.

Further, in another embodiment of the present invention, both of the first data and the second data can be text data or voice data. In this case, the processing rule may include processing the text data according to the above processing rule for the case where the first data is a text data and the second data is a video data and the detailed description thereof will be omitted here.

In the method according to the embodiment of the present invention, the P frame images and the Q frame images are obtained based on the obtained data of the two communication parties in data communication with each other. Then, the video stream of M frame images is generated based on the P frame images and the Q frame images according to a particular processing rule. In a typical data communication process, when one of the communication parties is sending data, the other is receiving the data, i.e., it is seldom that both communication parties send data at the same time. Therefore, in the method according to the embodiment of the present invention, by recognizing voice input, each frame image in the video data that contains no voice input can be filtered out, so as to generate a continuous video stream.

In the following, the electronic device according to an embodiment of the present invention will be described with reference to FIG. 3. As shown in FIG. 3, the electronic device according to this embodiment includes a communication unit 301, a data collection unit 302 and a data processing unit 303. The communication unit 301 is connected to the data collection unit 302 and the data processing unit 303. The data collection unit 302 is connected to the data processing unit 303.

The electronic device uses the communication unit 301 to establish a data channel with a second electronic device for data communication.

In an embodiment, the communication unit 301 is configured to establish, based on a first identifier, the data channel with the second electronic device having a second identifier for data communication, and notify the data processing unit 303 when the data channel is disconnected.

The data collection unit 302 is configured to obtain a first data of a user using the electronic device and obtain a second data of a user using the second electronic device based on the data channel with the second electronic device.

In particular, the data collection unit 302 can be, but not limited to, a voice collection module, a video collection module, a text input acquisition module, or any combination thereof. For example, the data collection unit 302 can collect instant communication data between a user of an instant communication system and his/her friend or contact. The communication data can be characters or audio or video data.

The data processing unit 303 is configured to: obtain P frame images based on the first data, where P is an integer larger than or equal to 1; obtain Q frame images based on the second data, where Q is an integer larger than or equal to 1; and generate a video stream of M frame images based on the P frame images and the Q frame images, where M<P+Q.

In an embodiment of the present invention, the data processing unit 303 is configured to, upon receiving a notification that the data channel is disconnected as transmitted from the communication unit 301, use the video stream of M frame images as a record for data communication performed by the electronic device with the second electronic device having the second identifier based on the first identifier, such that the video stream is played when a user of the first electronic device views the record.

In an embodiment of the present invention, the data processing unit 303 only deals with the scenario where the first data is a video data and the second data is a video data. In this case, the processing rule may include, but not limited to, recognizing whether each video data contains an object having a voice input and using each frame image in the video data that contains an object having a voice input as a frame image in the video stream.

Figure 4:
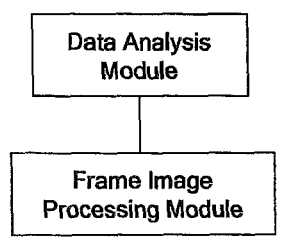
FIG. 4 is a schematic diagram showing internal modules of the data processing unit according to an embodiment of the present invention.

In this case, as shown in FIG. 4, the data processing unit may further include the following processing modules.

A data analysis module is configured to recognize whether each video data contains an object having a voice input and output each frame image in the video data that contains an object having a voice input to a frame image processing module. In particular, the data analysis module is configured to recognize, from the P frame images, K frame images in the first data each containing an object having a voice input, where K is a positive integer smaller than P; and recognize, from the Q frame images, J frame images in the second data each containing an object having a voice input, where J is a positive integer smaller than Q. Here, the data analysis module can determine whether the video data contains an object (e.g., the first user using the first electronic device or the second user using the second electronic device) having a voice input (i.e., whether there is someone talking) by recognizing an action of the user's mouth using an image recognition technique or recognizing whether the video data contains any voice data using a voice recognition technique.

The frame image processing module is configured to combine the K frame images and the J frame images in chronological order of their respective timestamps to generate the video stream of M frame images.

In addition, when each of the first data and the second data contains an object having a voice input, the frame image processing module can concatenate two corresponding frame images into one frame image in the video stream. For example, the two corresponding frame images can be scaled down to symmetrical left and right or upper and lower half-frame images, respectively, and the resulting two half-frame images can be concatenated into one frame image. Alternatively, two consecutive half-frame images can be concatenated.

With the electronic device according to the above embodiment, only the frame images each containing an object having a voice input are used as the frame images in the video stream and the "blank" data in the recorded video data can be filtered out, so as to generate a continuous video stream. In this way, the continuity of the generated video stream can be ensured. In addition, the generated video stream can be used as a communication record for the communication parties which is convenient for the user to view or play as desired. Further, the video or voice data can be clipped and concatenated, such that the resulting video stream can be more compact and continuous, with an improved viewing effect and a reduced storage space.

Alternatively, in an embodiment of the present invention, the data processing unit 303 only deals with the scenario where the first data is a text data and the second data is a video data. In this case, the processing rule may include, but not limited to, obtaining characters and timestamps corresponding to a valid text input, recognizing whether the video data contain an object having a voice input and using the characters corresponding to the valid text input and each frame image in the video data that contains an object having a voice input as a frame image in the video stream.

Figure 5:
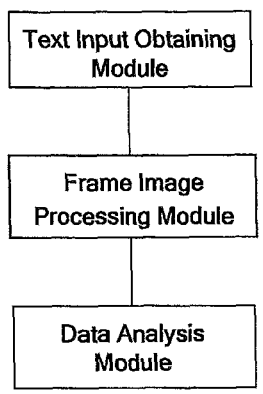
FIG. 5 is a schematic diagram showing internal modules of the data processing unit according to another embodiment of the present invention.

In this case, as shown in FIG. 5, the data processing unit 303 may further include the following processing modules.

A text input obtaining module is configured to obtain characters and timestamps corresponding to a valid text input and output them to a frame image processing module.

A data analysis module is configured to recognize whether the video data contain an object having a voice input and output each frame image in the video data that contains an object having a voice input to the frame image processing module.

The frame image processing module is configured to obtain frame images based on the characters corresponding to the valid text input, receive the frame images output from the data analysis module and combine these frame images in chronological order of their respective timestamps to generate the video stream of M frame images.

In this embodiment, assuming that the first data is a text data and the second data is a video data, the process can be as follows.

Upon collecting a valid text input operation (e.g., a text input ended with a carriage return), the text input obtaining module obtains the characters corresponding to the valid text input, recodes the timestamp corresponding to the valid text input (e.g., the time at which the special character is collected can be recorded as the timestamp of the valid text input) and output them to the frame image processing module.

The data analysis module recognizes, from the Q frame images, J frame images in the second data each containing an object having a voice input and outputs them to the frame image processing module, where J is a positive integer smaller than Q.

The frame image processing module generates P frame images corresponding to the valid text input by inserting the received characters corresponding to the valid text input into a blank frame or a frame having a picture or photo corresponding to the object as background, uses the received timestamp as the timestamp of the generated frame images, and then combines the P frame images and the J frame images in chronological order of their respective timestamps to generate the video stream of M frame images.

Here, the data analysis module can determine whether the video data contains an object (e.g., the second user using the second electronic device) having a voice input (i.e., whether there is someone talking) by recognizing an action of the user's mouth using an image recognition technique or recognizing whether the video data contains any voice data using a voice recognition technique.

Further, in an embodiment of the present invention, the data processing unit 303 can deal with the scenario where the first data is a voice data and the second data is a video data. In this case, the processing rule may include converting a voice input into a text input by means of voice recognition and performing the process for valid text input as described above. There are various approaches for converting a voice data into a corresponding text data. For example, voice can be converted into a corresponding text input by using an existing voice recognition and conversion technique. The present invention is not limited to any specific conversion process. Alternatively, a blank frame or one or more preset frame images can be used as the frame image(s) corresponding to the voice data.

With the electronic device according to the above embodiment, when the communication parties have different data formats of communication data, the communication data can be processed and stored according to the respective categories of data of the communication parties. For example, when it is inconvenient for one of the communication parties to have a video or voice communication while the other can have a video or voice communication, frame images can be generated based on characters corresponding to the input text in the text data. The generated frame images and the frame images obtained based on the video data can be used as frame images of a video stream. The video stream can then be stored as a communication record for the communication parties, so as to be viewed or displayed by the user as desired.

Figure 6:
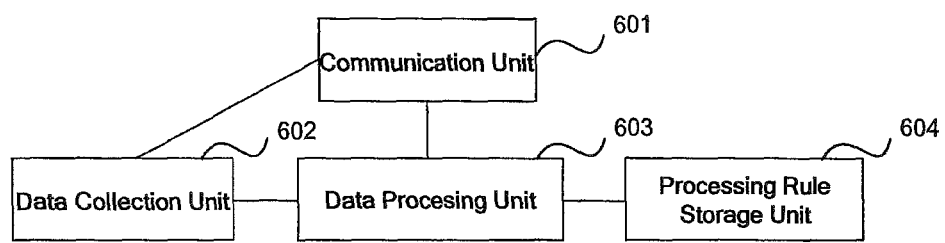
FIG. 6 is a schematic diagram showing the components of the electronic device according to an embodiment of the present invention.

As shown in FIG. 6, the electronic device according to an embodiment of the present invention includes a communication unit 601, a data collection unit 602, a data processing unit 603 and a processing rule storage module 604. The communication unit 601 is connected to the data collection unit 602 and the data processing unit 603. The data processing unit 603 is connected to the data collection unit 602 and the processing rule storage module 604.

The electronic device uses the communication unit 601 to establish a data channel with a second electronic device for data communication.

In an embodiment, the communication unit 601 is configured to establish, based on a first identifier, the data channel with the second electronic device having a second identifier for data communication, and notify the data processing unit 603 when the data channel is disconnected.

The data collection unit 602 is configured to obtain a first data of a user using the electronic device and obtain a second data of a user using the second electronic device based on the data channel with the second electronic device.

In particular, the data collection unit 602 can be, but not limited to, a voice collection module, a video collection module, a text input acquisition module, or any combination thereof. For example, the data collection unit 602 can collect instant communication data between a user of an instant communication system and his/her friend or contact. The communication data can be characters or audio or video data.

The data processing unit 603 is configured to: obtain P frame images based on the first data, where P is an integer larger than or equal to 1; obtain Q frame images based on the second data, where Q is an integer larger than or equal to 1; determine a processing rule based on respective categories of the first data and the second data; and generate the video stream of M frame images based on the P frame images and the Q frame images in accordance with the determined processing rule, where M<P+Q.

The processing rule storage module 604 stores a processing rule corresponding to different categories of the first data and the second data. Here, the processing rule storage module can be a processing module included in the data processing unit 603, or can be a standalone processing module.

The processing rule stored in the processing rule storage module 604 includes: when the first data is a video data and the second data is a video data, recognizing whether each video data contains an object having a voice input and using each frame image in the video data that contains an object having a voice input as a frame image in the video stream; and/or when the first data is a text data and the second data is a video data, obtaining characters and timestamps corresponding to a valid text input in the first data, recognizing whether the video data contain an object having a voice input and using the characters corresponding to the valid text input and each frame image in the video data that contains an object having a voice input as a frame image in the video stream.

Further, when the first data is a video data and the second data is a video data, the data processing unit 603 is configured to generate the video stream of M frame images based on the P frame images and the Q frame images in accordance with the determined processing rule by: recognizing, from the P frame images, K frame images in the first data each containing an object having a voice input, where K is a positive integer smaller than P; recognizing, from the Q frame images, J frame images in the second data each containing an object having a voice input, where J is a positive integer smaller than Q; and combining the K frame images and the J frame images in chronological order of their respective timestamps to generate the video stream of M frame images.

The data processing unit 603 may further include the following processing modules.

A data analysis module is configured to recognize whether each video data contains an object having a voice input and output each frame image in the video data that contains an object having a voice input to a frame image processing module. In particular, the data analysis module is configured to recognize, from the P frame images, K frame images in the first data each containing an object having a voice input, where K is a positive integer smaller than P; and recognize, from the Q frame images, J frame images in the second data each containing an object having a voice input, where J is a positive integer smaller than Q. Here, the data analysis module can determine whether the video data contains an object (e.g., the first user using the first electronic device or the second user using the second electronic device) having a voice input (i.e., whether there is someone talking) by recognizing an action of the user's mouth using an image recognition technique or recognizing whether the video data contains any voice data using a voice recognition technique.

The frame image processing module is configured to combine the K frame images and the J frame images in chronological order of their respective timestamps to generate the video stream of M frame images.

In addition, when each of the first data and the second data contains an object having a voice input, the frame image processing module can concatenate two corresponding frame images into one frame image in the video stream. For example, the two corresponding frame images can be scaled down to symmetrical left and right or upper and lower half-frame images, respectively and the resulting two half-frame images can be concatenated into one frame image. Alternatively, two consecutive half-frame images can be concatenated.

Further, when the first data is a video data and the second data is a video data, the data processing unit 603 is configured to generate the video stream of M frame images based on the P frame images and the Q frame images in accordance with the determined processing rule by: when each of the first data and the second data contains an object having a voice input, concatenating two corresponding frame images into one frame image as a frame image in the video stream.

Further, when the first data is a text data and the second data is a video data, the data processing unit 603 is configured to generate the video stream of M frame images based on the P frame images and the Q frame images in accordance with the determined processing rule by: obtaining P frame images based on the characters corresponding to the valid text input; recognizing, from the Q frame images, J frame images in the second data each containing an object having a voice input, where J is a positive integer smaller than Q; and combining the P frame images and the J frame images in chronological order of their respective timestamps to generate the video stream of M frame images.

In this case, the data processing unit 603 may further include the following processing modules.

A text input obtaining module is configured to obtain characters and timestamps corresponding to a valid text input and output them to a frame image processing module.

A data analysis module is configured to recognize whether the video data contain an object having a voice input and output each frame image in the video data that contains an object having a voice input to the frame image processing module.

The frame image processing module is configured to obtain frame images based on the characters corresponding to the valid text input, receive the frame images output from the data analysis module and combine these frame images in chronological order of their respective timestamps to generate the video stream of M frame images.

In this embodiment, when the first data is a text data and the second data is a video data, the process can be as follows.

Upon collecting a valid text input operation (e.g., a text input ended with a carriage return), the text input obtaining module obtains the characters corresponding to the valid text input, recodes the timestamp corresponding to the valid text input (e.g., the time at which the special character is collected can be recorded as the timestamp of the valid text input) and output them to the frame image processing module.

The data analysis module recognizes, from the Q frame images, J frame images in the second data each containing an object having a voice input and outputs them to the frame image processing module, where J is a positive integer smaller than Q.

The frame image processing module generates P frame images corresponding to the valid text input by inserting the received characters corresponding to the valid text input into a blank frame or a frame having a picture or photo corresponding to the object as background, uses the received timestamp as the timestamp of the generated frame images, and then combines the P frame images and the J frame images in chronological order of their respective timestamps to generate the video stream of M frame images.

Here, the data analysis module can determine whether the video data contains an object (e.g., the second user using the second electronic device) having a voice input (i.e., whether there is someone talking) by recognizing an action of the user's mouth using an image recognition technique or recognizing whether the video data contains any voice data using a voice recognition technique.

Further, in an embodiment of the present invention, the processing rule stored in the processing rule storage module 604 can deal with the scenario where the first data is a voice data and the second data is a video data. In this case, the processing rule may include converting a voice input into a text input by means of voice recognition and performing the process for valid text input as described above. There are various approaches for converting a voice data into a corresponding text data. For example, voice can be converted into a corresponding text input by using an existing voice recognition and conversion technique. The present invention is not limited to any specific conversion process. Alternatively, a blank frame or one or more preset frame images can be used as the frame image(s) corresponding to the voice data.

Further, in an embodiment of the present invention, the processing rule stored in the processing rule storage module 604 can deal with the scenario where both of the first data and the second data can be text data or voice data. In this case, the processing rule may include processing the text data according to the above processing rule for the case where the first data is a text data and the second data is a video data and the detailed description thereof will be omitted here.

In the following, the embodiments of the present invention will be further detailed with reference to an application example.

In this application example, the information processing method of the present invention can be applied in a first electronic device. An instant communication User A uses the first electronic device as an instant communication terminal for instant communication with User B using a second electronic device. The first electronic device processes the communication data of User A and User B. In this application example, it is assumed that each of the first and second electronic devices has a video call function. The method in this application example includes mainly the following steps.

At step 1, User A having a first identifier and User B having a second identifier use the first electronic device and the second electronic device, respectively, to establish a data channel for instant communication.

At step 2, while User A is making a video call, the first electronic device collects the video or voice data generated by User A as a first data.

Here, the first electronic device collects and records the video or audio data of User A using a local voice/video collection unit. For example, it may start recording the voice/video data of User A once the data channel is established between User A and User B.

At step 3, while User B is making a video call, the first electronic device collects the video or voice data generated by User B as a second data.

Here, the first electronic device can receive data packets containing the video or voice data of User B over the data channel with the second electronic device. In particular, the video or voice data of User B can be encapsulated into data packets according to a particular protocol format such as Transmission Control Protocol (TCP) or User Datagram Protocol (UDP). The data packets can be transmitted to the first electronic device via an instant communication server or in a peer-to-peer (P2P) manner. Upon receiving the data packets, the first electronic device parses them and stores them as the second data.

At step 4, the first electronic device generates a video stream based on the first data and the second data. In particular, this step includes:

obtaining P frame images based on the first data and recognizing, from the P frame images, K frame images in the first data each containing an object having a voice input (i.e, when User A is talking), where P is an integer larger than or equal to 1 and K is a positive integer smaller than P;

obtaining Q frame images based on the second data and recognizing, from the Q frame images, J frame images in the second data each containing an object having a voice input (i.e, when User B is talking), where Q is an integer larger than or equal to 1 and J is a positive smaller than Q; and combining the K frame images and the J frame images in chronological order of their respective timestamps to generate a video stream of M frame images, where M<P+Q.

In addition, when User A and User B are talking simultaneously, two corresponding frame images can be combined. For example, the two corresponding frame images can be scaled down to symmetrical left and right or upper and lower half-frame images, respectively, and the resulting two half-frame images can be concatenated into one frame image. Alternatively, two consecutive half-frame images can be concatenated.

At step 5, the first electronic device uses the generated video stream as a record for data communication performed by the first electronic device with the second electronic device having the second identifier based on the first identifier and stores the generated video stream.

In this application example, the identification information of the video stream can be obtained by combining or converting the identifiers of User A and User B. Thus, the stored record for the data communication can be identified uniquely.

In the above application example according to the present invention, e.g., the video data of the instant communication users can be saved efficiently and the generated video stream can be used as a communication record for the communication parties. By storing the video stream locally, the contents of the video call between the users can be saved efficiently for later view and play. Further, the video or voice data can be clipped and concatenated, such that the resulting video stream can be more compact and continuous and capable of providing the user with a better viewing effect.

It can be appreciated by those skilled in the art that the apparatuses and/or components of the system as well as the steps in the method, as described in the above embodiments of the present application, can be concentrated at one single computing device or distributed across a network composed of a number of computing devices. Optionally, they can be implemented by program instructions executable by a computing device. Therefore, they can be stored in a storage device and executed by a computing device or can be implemented by various integrated circuit modules, respectively. Alternatively, more than one of these modules or steps can be implemented by one single integrated circuit module. Therefore, the present invention is not limited to any specific combination of hardware and software.

While the embodiments of the present invention have been disclosed above, the embodiments are only used to facilitate the understanding of the present invention, rather than limiting its scope. Various modifications and alternatives can be made to the embodiments by those skilled in the art without departing from the spirit and scope of the present invention. The present invention is only defined by the scope of the claims as attached.

What is claimed is:

1. An information processing method applied in a first electronic device, the method comprising:
    obtaining a first data;
    obtaining P frame images based on the first data, where P is an integer larger than or equal to 1;
    obtaining a second data based on a data channel with a second electronic device;
    obtaining Q frame images based on the second data, where Q is an integer larger than or equal to 1;
    generating a video stream of M frame images based on the P frame images and the Q frame images, where M<P+Q;
    wherein if the first data is text data, the step of obtaining the P frame images based on the first data includes generating, each time a valid text input which has been successfully transmitted to the second electronic device is collected at the first electronic device, a frame image corresponding to the valid text input.

2. The method of claim 1, wherein
    the first electronic device establishes, based on a first identifier, the data channel with the second electronic device having a second identifier for data communication, and
    when the data channel is disconnected, the electronic device uses the video stream of M frame images as a record for data communication performed by the first electronic device with the second electronic device having the second identifier based on the first identifier, such that the video stream is played when a user of the first electronic device views the record.

3. The method of claim 1, wherein at least one of the first data and the second data is a video data.

4. The method of claim 1, wherein
    the first electronic device determines a processing rule for generating the video stream of M frame images based on respective categories of the first data and the second data.

5. The method of claim 4, wherein
    when the first data is a video data and the second data is a video data, the processing rule comprises recognizing whether the first or second data contains an object having a voice input and using each frame image in the first or second data that contains an object having a voice input as a frame image in the video stream, and
    said generating the video stream of M frame images based on the P frame images and the Q frame images comprises:
    recognizing, from the P frame images, K frame images in the first data each containing an object having a voice input, where K is a positive integer smaller than P;
    recognizing, from the Q frame images, J frame images in the second data each containing an object having a voice input, where J is a positive integer smaller than Q; and
    combining the K frame images and the J frame images in chronological order of their respective timestamps to generate the video stream of M frame images.

6. The method of claim 5, wherein
    when the first data is a video data and the second data is a video data, the processing rule further comprises: when each of the first data and the second data contains an object having a voice input, concatenating two corresponding frame images into one frame image as a frame image in the video stream.

7. The method of claim 4, wherein
    when the first data is a text data and the second data is a video data, the processing rule comprises obtaining characters and timestamps corresponding to a valid text input in the first data, recognizing whether the second data contains an object having a voice input, and using the characters corresponding to the valid text input and each frame image in the second data that contains an object having a voice input as a frame image in the video stream;
    said generating the video stream of M frame images based on the P frame images and the Q frame images comprises:
    obtaining P frame images based on the characters corresponding to the valid text input;
    recognizing, from the Q frame images, J frame images in the second data each containing an object having a voice input, where J is a positive integer smaller than Q; and combining the P frame images and the J frame images in chronological order of their respective timestamps to generate the video stream of M frame images.

8. An electronic device, comprising:
a communication circuitry configured to establish a data channel with a second device;
a data collection circuitry configured to obtain a first data and obtain a second data based on a data channel with the second electronic device; and
a data processing circuitry configured to:
obtain P frame images based on the first data, where P is an integer larger than or equal to 1;
obtain Q frame images based on the second data, where Q is an integer larger than or equal to 1; and
generate a video stream of M frame images based on the P frame images and the Q frame images, where M<P+Q;
wherein if the first data is text data, the data processing unit is configured to generate, each time a valid text input which has been successfully transmitted to the second electronic device is collected at the electronic device, a frame image corresponding to the valid text input.

9. The electronic device of claim 8, wherein
the communication circuitry is configured to establish, based on a first identifier, the data channel with the second electronic device having a second identifier for data communication, and notify the data processing circuitry when the data channel is disconnected, and
the data processing circuitry is configured to, upon receiving a notification that the data channel is disconnected, use the video stream of M frame images as a record for data communication performed by the electronic device with the second electronic device having the second identifier based on the first identifier, such that the video stream is played when a user of the first electronic device views the record.

10. The electronic device of claim 9, further comprising:
a processing rule storage module configured to store a processing rule corresponding to different categories of the first data and the second data,
wherein the data processing circuitry is configured to determine a processing rule based on respective categories of the first data and the second data and generate the video stream of M frame images based on the determined processing rule.

11. The electronic device of claim 10, wherein
the processing rule stored in the processing rule storage module comprises:
when the first data is a video data and the second data is a video data, recognizing whether the first or second data contains an object having a voice input and using each frame image in the first or second data that contains an object having a voice input as a frame image in the video stream, and
when the first data is a text data and the second data is a video data, obtaining characters and timestamps corresponding to a valid text input in the first data, recognizing whether the second data contain an object having a voice input and using the characters corresponding to the valid text input and each frame image in the second data that contains an object having a voice input as a frame image in the video stream.

12. The electronic device of claim 8, wherein
when the first data is a video data and the second data is a video data, the data processing circuitry is configured to generate the video stream of M frame images based on the P frame images and the Q frame images by:
recognizing, from the P frame images, K frame images in the first data each containing an object having a voice input, where K is a positive integer smaller than P;
recognizing, from the Q frame images, J frame images in the second data each containing an object having a voice input, where J is a positive integer smaller than Q; and
combining the K frame images and the J frame images in chronological order of their respective timestamps to generate the video stream of M frame images.

13. The electronic device of claim 12, wherein
when the first data is a video data and the second data is a video data, the data processing circuitry is configured to generate the video stream of M frame images based on the P frame images and the Q frame images by:
when each of the first data and the second data contains an object having a voice input, concatenating two corresponding frame images into one frame image as a frame image in the video stream.

14. The electronic device of claim 8, wherein
when the first data is a text data and the second data is a video data, the data processing circuitry is configured to generate the video stream of M frame images based on the P frame images and the Q frame images by:
obtaining P frame images based on the characters corresponding to the valid text input in the first data;
recognizing, from the Q frame images, J frame images in the second data each containing an object having a voice input, where J is a positive integer smaller than Q; and
combining the P frame images and the J frame images in chronological order of their respective timestamps to generate the video stream of M frame images.

* * * * *